June 7, 1938. J. E. ADERHOLD, JR., ET AL 2,119,766
VALVE
Filed Jan. 7, 1936
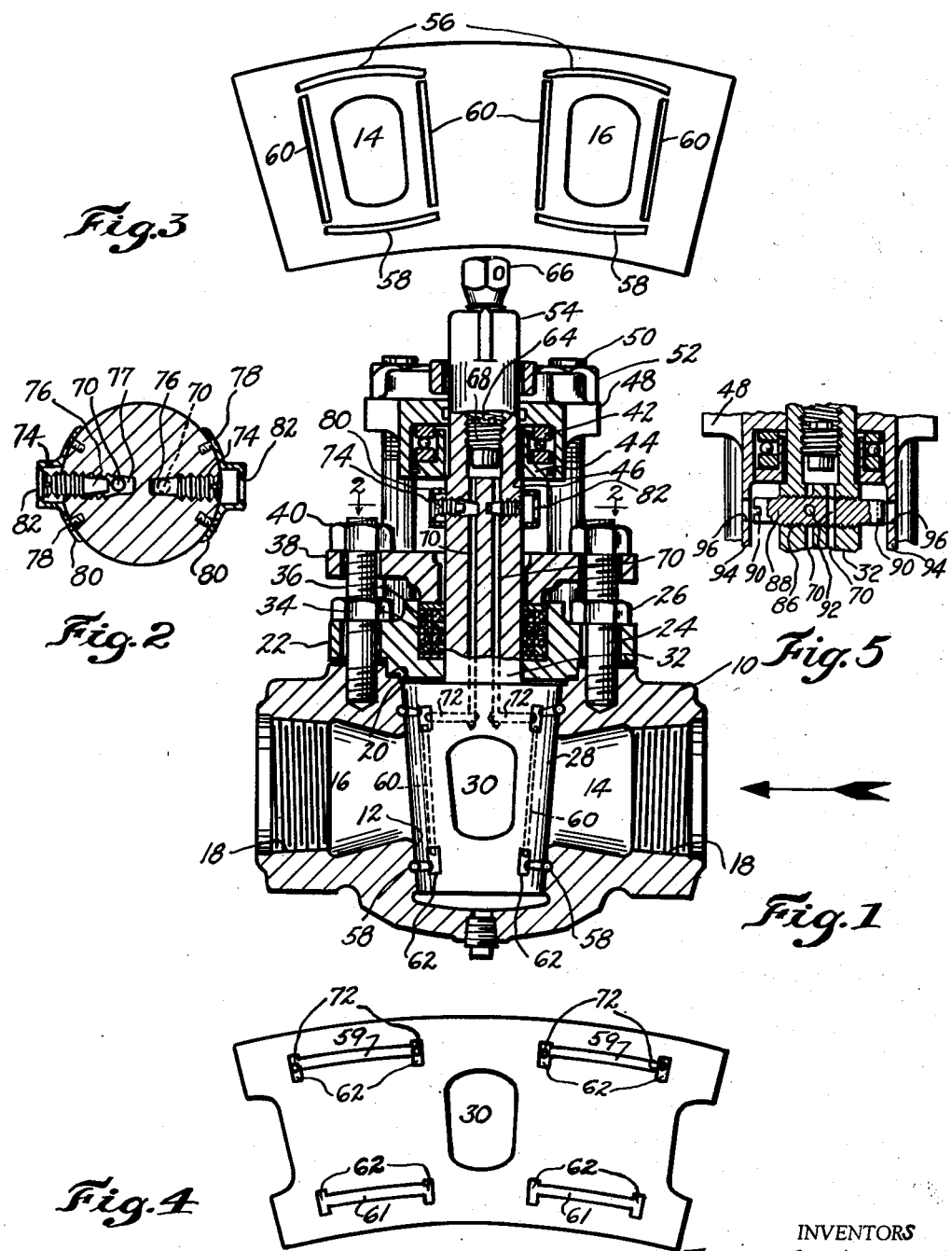
INVENTORS
Joseph E. Aderhold Jr.
BY and Oliver E. Duemler
Albert J. Henderson
ATTORNEY.

Patented June 7, 1938

2,119,766

UNITED STATES PATENT OFFICE 2,119,766

VALVE

Joseph E. Aderhold, Jr., and Oliver E. Duemler, Los Angeles, Calif., assignors to Walworth Patents Inc., Boston, Mass., a corporation of Massachusetts Application January 7, 1936, Serial No. 57,914

12 Claims. (Cl. 251—93)

This invention relates to valves and more particularly to lubricated plug valves.

Plug valves when properly lubricated on the seating surfaces to eliminate leakage and sticking are desirable for use in certain services where high pressures in the line are encountered. An example of such use is in connection with the deep drilling of wells through high pressure formations requiring high pressure in the mud lines. When plug valves in such lines are in closed position and subjected to these high pressures, there is a tendency for the plug member to move bodily or tilt in the valve body away from the upstream side and toward the downstream side, regardless of the extreme care which is used in manufacture to insure a close fit between seating surfaces of these members.

Consequently, if lubricant is fed indiscriminately to both sides of the valve, such lubricant is merely wasted, because of its tendency to flow in the easiest path between the seating surfaces on the upstream side where a small clearance exists. Under these circumstances, sufficient pressure cannot be built up in the lubricant system to free the plug from its seat and the plug is, therefore, extremely hard to rotate.

It is an object of this invention to assure lubrication of the valve in the closed position on the side which requires it.

Another object of the invention is to provide a single source from which lubricant may be supplied to the seating surfaces.

Another object of the invention is to distribute lubricant to the entire seating surface in the open position while restricting the distribution in the closed position.

Another object of the invention is to seal completely around the fluid passageways in both open and closed positions.

Another object of the invention is to prevent line fluid from washing out the lubricant in the system when the plug is rotated from one position to another.

Other objects and advantages will become apparent from the following description taken in connection with the accompanying drawing wherein:—

Fig. 1 is a front view partly in section of a valve embodying the invention.

Fig. 2 is a section taken on the line 2—2 of Fig. 1 and looking in the direction indicated by the arrows.

Fig. 3 is a development of the seating surface of the valve body showing the arrangement of lubricant grooves therein.

Fig. 4 is a similar development of the valve plug and

Fig. 5 is a fragmentary sectional view of a modification.

Referring more particularly to the drawing, the valve comprises a body member 10 having a tapered valve seat 12 therein provided with fluid passageways 14 and 16 extending transversely thereof. The fluid passageways 14 and 16 extend from the valve seat 12 completely through the ends of the body 10 and may be provided with internal threaded portions 18 or other suitable connecting means for securing the valve in a pipe line. At the larger end of the valve seat 12 is a recess 20 provided for the reception of part of an annular cover 22 which is secured to the body 10 by means of the studs 24 and nuts 26.

Seated in the body 10 and rotatably engaging the valve seat 12 is a tapered plug member 28 having a port 30 extending transversely therethrough and being adapted to register with the passageways 14 and 16 when the valve is in open position. A stem 32 extends from the larger end of the plug member 28 through the cover 22 and a portion of the cover is recessed as at 34 forming a stuffing box around the stem for the reception of a packing 36. The packing may be compressed into engagement with the stem by means of a packing gland 38 which is adjustable by means of nuts 40 engaging the studs 24 which project through the cover 22 and the gland 38.

In this embodiment of the invention the plug member 28 is retained in its seat by the provision of an anti-friction bearing 42 which is held in engagement with a bushing 44 seated on the stem shoulder 46 by a yoke member 48. The yoke member 48 is carried upon suitable studs 50 extending from the cover 22 and may be adjusted thereon relative to the stem 32 by means of the nuts 52. The stem 32 may extend through the yoke 48 and the projecting end 54 may be suitably squared for the reception of a wrench or other tool whereby the plug may be rotated in its seat.

The foregoing arrangement for retaining a tapered plug member in fixed axial position relative to its seat is not part of the invention to be described herein, but is fully described and claimed in the co-pending application of Joseph E. Aderhold, Jr., Serial No. 744,895, filed September 21, 1934.

This invention more specifically relates to a means to insure thorough lubrication of the seating surfaces of the valve member and its seat. To this end, the valve seat 12 formed in the body 10 is provided with a pair of diametrically opposite transverse lubricant grooves 56, each of which is located above one of the fluid passageways 14 and 16, respectively, and each extending through an angle of approximately ninety degrees. The seating surface 12 is further provided with a pair of diametrically opposite transverse lubricant grooves 58, each located below one of the fluid passageways 14 and 16 and being similar to the lubricant grooves 56 which are positioned thereabove. Furthermore, the valve seat 12 is provided with four longitudinal grooves 60 which are located on each side of the passageways 14 and 16 and between the transverse grooves 56 and 58 at each end of the body but terminating short of connection with these transverse grooves.

One end of the seating surface of the plug member 28 is, in this instance, provided with a pair of diametrically opposite transverse lubricant grooves 59 which extend substantially parallel with the port 30 through an angle of approximately ninety degrees and overlie the transverse grooves 56 in the valve seat when the valve is in closed position. In the other end of the seating surface of the plug member 28 is a pair of similar transverse grooves 61 which overlie the transverse grooves 58 in the valve seat 12 when the valve is in closed position.

The grooving system is completed by the provision of eight dwarf grooves 62, four of which are located above the port 30 in the valve member and the remaining four therebelow. These dwarf grooves 62 are arranged in pairs at either end of the transverse grooves 59 and 61 and thus will overlie the ends of the transverse grooves 56 and 58 and the longitudinal grooves 60 when the valve is in full open or full closed position. It will be apparent that the transverse grooves 59 and 61 in the plug will move from overlying relation with the transverse grooves 56 and 58 in the valve seat when the valve member 28 is rotated and will lie between these latter grooves when full-open position is reached. When the valve member 28 is rotated in the seat 12 from the full open position, the dwarf grooves 62 therein are immediately disconnected from communication with the longitudinal grooves 60 and thus the complete framing of the passageways is no longer present. However, during this rotating movement of the plug, two diametrically opposite longitudinal grooves will be exposed to the fluid in the line as the port 30 passes across them and consequently, it has been arranged that these exposed grooves shall be cut off from the lubricant supply during this period. In order to render the valve rotatable in either clockwise or counter-clockwise direction without exposing any connected lubricant grooves to the fluid in the line, all of the longitudinal grooves 60 have been arranged to terminate short of the transverse grooves 56 and 58 and thus achieve this object.

Lubricant may be supplied to the grooves in a convenient manner from a suitable reservoir 64 formed in the upper portion of the valve stem 32. The reservoir 64, in this instance, is threaded for the reception of a compressor screw 66 and is further provided with a check valve 68 to prevent regress of lubricant therefrom when the compressor screw is removed. Extending longitudinally through the stem 32 from the reservoir 64 is a pair of passageways 70 each of which communicate at their opposite ends with a pair of ducts 72 leading from the dwarf grooves 62 formed in the upper portion of the plug member 28. The lubricant from the reservoir 64 therefore flows by separate paths to each frame of grooves formed in the seating surface of the valve.

The passage of lubricant from the reservoir 64 through the passageways 70 is controlled by providing each passage with an individual plug member 74, each of which is threaded into the valve stem from opposite sides thereof and provided with tapered extensions 76 adapted to closely engage similarly tapered apertures 77 lying transversely of the passages 70. The plug members 74 when fully seated in the apertures should lie flush or slightly below the surface of the stem 32 in order not to interfere with the free longitudinal movement of the packing gland or packing on the stem. Attached to the valve stem 32 by means of the screws 78 is a pair of cup-shaped housings 80 for the plug members 74. The housings 80 are provided with openings 82 in axial alignment with the plug members 74 and of sufficient size to permit the insertion of a screw driver or other tool whereby the plug members may be operated. Preferably, the openings 82 are of smaller size than the plug members 74 so that these members will abut the housings 80 when withdrawn from the apertures 77 sufficiently to open the passageways 70 and form a seal against leakage of line fluid which might otherwise occur.

When the valve is used to close a pipe line carrying fluid under high pressure any tendency of the pressure on one side of the valve to tilt or move the valve member 28 bodily in its seat will not prevent the valve from being lubricated. Assuming that the passageway 14 is the upstream side of the valve it is apparent that the valve member 28 may be moved into close engagement with that part of the valve seat 12 adjacent the passageway 16 on the downstream side, owing to the difference in pressure at each end of the valve. Consequently, it is desirable that the closely engaged part of the valve member and its seat be lubricated before the valve is rotated. For the purpose of this description it will be assumed that the threaded plug members 74 have been withdrawn from the apertures 77 and hence both passages 70 are open. Lubrication of one side of the valve seat can be accomplished by moving the plug member 74 controlling the passage 70 on the upstream side of the valve into position to close this passage. Upon operation of the compressor screw 66 lubricant from the reservoir 64 will flow through the other passage 70 and ducts 72 to the upper transverse groove 56. Hence, a complete frame of lubricant under pressure may be formed around the passageway 16 on the downstream side and the valve is both lubricated and sealed. In view of the fact that the grooves on the upstream side of the valve cannot receive lubricant due to the closing of passage 70 leading to the upstream side no lubricant is wasted by escaping through the clearance between the valve member and its seat on this side of the valve and thus into the line.

It often happens, however, that in the use of these valves the direction of fluid flow is changed and the upstream becomes the downstream side of the valve. In such case, the opposite side of the valve will require lubricating and this can be readily accomplished by reversing the positions of the plug members 74, that is, to withdraw the one previously in closed position and to advance the one previously in open position. If desired, both of the plug members 74 may be withdrawn from their closed position to permit lubricant to reach both sides of the valve simultaneously.

A modified form of control for distributing the lubricant to the passages 70 is shown in Fig. 5. In this embodiment the valve stem 32 is provided with an aperture 86 extending completely therethrough and transversely of the passages 70. This aperture 86 is preferably threaded for the reception of a threaded plug member 88 having reduced opposite ends projecting from the aperture and provided with slots 90 for the reception of a screwdriver by means of which the plug may be turned. It will be apparent that other suitable means may be employed for effecting rotation of the plug, but the slots 90 are preferred for a reason which will be described hereinafter. The plug is furthermore provided with a pair of holes 92 extending completely therethrough and transversely of the axis thereof, said holes being perpendicular to each other so that when one is in registry with one of the passages 70 the other will be perpendicular to the other passage 70.

It will be apparent that rotation of the plug 88 a quarter turn will serve to change the flow of lubricant from one side of the valve to the other as desired. If each of the slots 90 is formed in the same plane as the adjacent hole 92 it will be apparent that visual indication is afforded of the position of the holes with respect to the passages 70. That is, when one of the slots 90 is perpendicular to the axis of the valve member it will be manifest that the passage 70 on the same side is closed and the opposite passage open. The yoke 48 in this embodiment may be provided with a depending flange 94 extruding beyond and forming a housing for the plug 88. Access to the slots in the plug may be provided by openings 96 formed in the flange 94 opposite the plug and of sufficient size to permit insertion of a screwdriver.

In the open position of the valve there is, of course, no tendency for the line fluid to tilt or otherwise move the plug member 28 bodily toward one side of the valve seat. Consequently, there is no reason for restricting the distribution of lubricant to only one side of the seating surface. In the grooving arrangement disclosed herein, provision is made for automatically removing the restrictions upon the lubricant distribution as the plug member moves to open position.

In this position the transverse grooves formed in the plug lie between the transverse grooves in the valve seat and provide, in effect, two single continuous grooves surrounding the plug, one above and one below the fluid passageway. Hence, lubricant from the reservoir may be fed through either of the passages 70 to the composite circumferential groove thus formed above the fluid passageways and will be distributed thereby to all of the grooves in the lubricating system.

It will be understood that the location of the lubricant grooves is not limited to the arrangement described herein. It will be apparent that the grooves shown and described herein as being in the valve seat could equally well be placed in the plug while the grooves now in the plug could be formed in the valve seat without in any way changing the operation of the lubricant system from that previously described.

From the foregoing it will be apparent that a valve constructed as described has a wide field of usefulness. There is ample choice for the operator either to lubricate the entire seating surface around the passageways or to lubricate one side only. In both the full-open and full-closed positions of the valve the body passageways are completely framed by lubricant grooves, but if in closed position the line fluid enters on one side it cannot travel around the grooves to the other side and thus destroy the seal at both ends of the body. Furthermore, when the plug is rotated and certain longitudinal grooves are exposed to the fluid in the line, these grooves are cut off from the lubricant supply and thus no lubricant is wasted.

We claim:

1. A lubricated plug valve comprising a body member having a valve seat provided with transverse fluid passageways, a valve member engaging said seat and provided with a port adapted to register with said passageways when the valve is in open position, a stem extending from said valve member, a lubricant reservoir in said stem, means for conveying lubricant separately from said reservoir to the seating surfaces adjacent each of said passageways when the valve is in closed position and to the seating surfaces intermediate said passageways when the valve is in open position, and means carried by said stem and operable on said conveying means to confine said lubricant to the conveying means leading to a selected seating surface.

2. A lubricated plug valve comprising a body member having a valve seat provided with transverse fluid passageways, a valve member engaging said seat and provided with a port adapted to register with said passageways when the valve is in open position, a lubricant reservoir associated with said valve, a plurality of passages leading separately from said reservoir to the seating surfaces adjacent each of said passageways, and means individually operable on each of said passages for confining said lubricant to the passage leading to a selected seating surface.

3. A lubricated plug valve comprising a body member having a valve seat provided with transverse fluid passageways, a valve member engaging said seat and provided with a port adapted to register with said passageways when the valve is in open position, a lubricant reservoir associated with said valve, a plurality of passages leading separately from said reservoir to the seating surfaces adjacent each of said passageways, and plug members movable individually to open and close said passages for controlling the passage of lubricant therethrough.

4. A lubricated plug valve comprising a body member having upstream and downstream passageways for line fluid and a valve seat intermediate said passageways, a valve member engaging said seat, a stem extending from said valve member, a lubricant reservoir in said stem, a plurality of separate passages leading from said reservoir to the seating surfaces adjacent each of said passageways when the valve is in closed position and to the seating surfaces intermediate said passageways when the valve is in open position, and means carried by said stem for closing the passage leading to the seating surface adjacent the upstream passageway when the valve is in closed position for preventing the passage of lubricant therethrough.

5. A lubricated plug valve comprising a body member having a valve seat provided with transverse fluid passageways, a valve member engaging said seat and provided with a port adapted to register with said passageways when the valve is in open position, means for introducing lubricant to the seating surfaces of said members including a plurality of grooves overlying one another in unconnected groups in one position of the valve and being extended one from the other in another position of the valve.

6. A lubricated plug valve comprising a body member having a valve seat provided with transverse fluid passageways, a valve member engaging said seat and provided with a port adapted to register with said passageways when the valve is in open position, means for introducing lubricant to the seating surfaces of said members including unconnected groups of transverse and longitudinal grooves in one of said members, and unconnected groups of transverse grooves in the other said member adapted to overlie the transverse grooves in the first said member when the valve is in closed position for forming a substantially continuous groove around at least one of said passageways.

7. A lubricated valve comprising a body member having a valve seat provided with transverse fluid passageways, a valve member engaging said seat and provided with a port adapted to register with said passageways when the valve is in open position, means for introducing lubricant to the seating surfaces of said members including unconnected groups of transverse grooves in one of said members located above and below the fluid passageways, longitudinal grooves in said member terminating short of communication with said transverse grooves and located on each side of said port and passageways in the full-open and full-closed positions of said valve, and unconnected groups of transverse grooves in the other said member adapted to connect the longitudinal and transverse grooves in at least one of said groups of grooves in the first said member so as to form a substantially continuous groove around at least one of said passageways when the valve is in closed position, said connection being disrupted when the valve member is moved from said position, said transverse grooves in one member cooperating with those in the other said member for connecting said groups of grooves and forming a continuous circumferential groove around the seating surfaces when the valve is in open position.

8. A lubricated valve comprising a body member having a valve seat, a valve member engaging said seat, means for introducing lubricant to the seating surfaces of said members including non-continuous circumferential grooves in one of said members, longitudinal grooves in the seating surface of the other member adapted for communication with said first named grooves in certain positions of said valve and for non-communication upon movement from said positions, and non-continuous circumferential grooves in the seating surface of the said other member adapted to cooperate with the other said non-continuous grooves to form a continuous circumferential groove around the seating surface when the valve is in one position.

9. A lubricated plug valve comprising a body member having a valve seat provided with transverse fluid passageways, a valve member engaging said seat and provided with a port adapted to register with said passageways when the valve is in open position, a stem extending from said valve member, a lubricant reservoir in said stem, means for conveying lubricant separately from said reservoir to the seating surfaces adjacent each of said passageways when the valve is in closed position and to the seating surfaces intermediate said passageways when the valve is in open position, a plurality of grooves forming a complete and independent frame of sealing grooves around the passageway at each end of the body in the full-closed position, and means carried by said stem and operable on said conveying means to confine said lubricant to the conveying means leading to a selected frame of grooves.

10. A lubricated plug valve comprising a body member having a valve seat provided with upstream and downstream passageways for line fluid, a valve member engaging said seat and provided with a port adapted to register with said passageways when the valve is in open position, a stem extending from said valve member, a lubricant reservoir in said stem, transverse lubricant grooves located above and below the passageways in said body at each end thereof, longitudinal grooves in one of said members terminating short of communication with said transverse grooves and located on each side of said port and passageways when the valve is in full-open or full-closed position, dwarf grooves in the other said member extending from each of the longitudinal grooves to the transverse grooves when the valve member is in full-closed position to form a complete and independent frame of sealing grooves around the passageway at each end of the body, a plurality of passages leading from said reservoir to the lubricant grooves to convey lubricant separately to each frame of grooves, and threaded plug members carried by said stem and movable individually into the passages for preventing the passage of lubricant to the grooves on the upstream side, when the valve is in closed position.

11. A lubricated plug valve comprising a body member having upstream and downstream passageways for line fluid and a valve seat intermediate said passageways, a valve member engaging said seat, a stem extending from said valve member, a lubricant reservoir in said stem, a plurality of separate passages leading from said reservoir to the seating surfaces adjacent each of said passageways when the valve is in closed position and to the seating surfaces intermediate said passageways when the valve is in open position, a rotatable plug member in said stem extending transversely of said passages and having a plurality of holes therethrough each adapted to communicate with one of said passages, one of said holes being in communication with the passage leading to the seating surface adjacent the downstream passageway while another is out of communication with the passage leading to the seating surface adjacent the upstream passageway.

12. A lubricated plug valve, comprising a body member having a valve seat provided with fluid passageways, a valve member engaging said seat and provided with a port adapted to register with said passageways when the valve is in open position, a lubricant reservoir associated with said valve, means for conveying lubricant from said reservoir for distribution to the seating surfaces of said valve and body members, and means for confining the distribution of said lubricant to the seating surfaces around one of said passageways in the closed position of the valve while providing for distribution around each of said passageways and intermediate parts of the seating surfaces in the open position of the valve.

JOSEPH E. ADERHOLD, Jr.
OLIVER E. DUEMLER.